(12) United States Patent
Ogawa

(10) Patent No.: US 7,620,504 B2
(45) Date of Patent: Nov. 17, 2009

(54) ROAD-SURFACE CONDITION ESTIMATING DEVICE

(75) Inventor: Hiroshi Ogawa, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/213,785

(22) Filed: Jun. 24, 2008

(65) Prior Publication Data
US 2008/0319683 A1 Dec. 25, 2008

(30) Foreign Application Priority Data
Jun. 25, 2007 (JP) ............................. 2007-166807

(51) Int. Cl.
*G01L 1/00* (2006.01)
*G01P 15/00* (2006.01)
(52) U.S. Cl. ............................. 702/41; 701/70; 702/141
(58) Field of Classification Search .................. 702/41, 702/141, 142, 150, 182; 701/34, 45, 70
See application file for complete search history.

(56) References Cited
U.S. PATENT DOCUMENTS
5,960,376 A * 9/1999 Yamakado et al. .......... 702/141

6,904,349 B2 * 6/2005 Mori ............................ 701/70
7,206,702 B2 * 4/2007 Isono et al. .................... 702/41

FOREIGN PATENT DOCUMENTS
JP 6-323171 11/1994
JP 2006-23287 1/2006

* cited by examiner

*Primary Examiner*—John H Le
(74) *Attorney, Agent, or Firm*—Smith, Gambrell & Russell, LLP

(57) ABSTRACT

A driving-torque difference value, an inertial-force difference value of the vehicle, and an inertial-force change-amount difference value of the vehicle are calculated. Subsequently, a first determination coefficient by which the inertial-force difference value is to be multiplied or a second determination coefficient by which the driving-torque difference value is to be multiplied is estimated on the basis of a state equation having the inertial-force difference value as a state variable and the driving-torque difference value as an input variable. Subsequently, a road-surface condition is determined on the basis of a comparison between a threshold value and the first determination coefficient or the second determination coefficient.

4 Claims, 5 Drawing Sheets

ROAD-SURFACE CONDITION ESTIMATING DEVICE

CROSS REFERENCES TO RELATED APPLICATIONS

The disclosure of Japanese Patent Application No. 2007-166807 filed on Jun. 25, 2007 including the specification, drawings, and abstract is incorporated herein by reference in its entirety.

BACKGROUND OF THE INVENTION

1. Field of the Invention

The present invention relates to a road-surface condition estimating device in a vehicle that estimates a road-surface condition with high accuracy on the basis of a relationship between a road-surface friction coefficient and a slip rate of the wheels.

2. Description of the Related Art

In recent years, there have been proposed and put in practical use various control technologies for vehicles, such as traction control, braking-force control, and torque-distribution control technologies. In many of these technologies, the calculation or correction of required control parameters is implemented in accordance with the road surface on which the vehicle is running and the grip condition of the tires. For example, Japanese Unexamined Patent Application Publication No. 6-323171 discloses a technology for setting a correction torque which is to be subtracted from a driving torque on the basis of a slip amount. To describe this technology in more detail, when the vehicle speed of a four-wheel drive vehicle is below a predetermined value of, for example, 20 km/h, a longitudinal acceleration detected by a longitudinal acceleration sensor is subjected to a filtering process. Subsequently, a filtered longitudinal acceleration having undergone a peak-hold process is selected. In contrast, when the vehicle speed is above or equal to the predetermined value, a longitudinal acceleration not having undergone a peak-hold process is selected. Then, the vehicle speed is determined by integrating the selected longitudinal accelerations. A difference between the determined vehicle speed and an average speed of a plurality of speeds included in the rotation speeds of the wheels is regarded as a slip amount, and a correction torque to be subtracted from a driving torque is set on the basis of this slip amount.

In the technology disclosed in Japanese Unexamined Patent Application Publication No. 6-323171, however, the vehicle speed is determined by simply integrating the longitudinal accelerations but is not determined in view of the case where the road on which the vehicle is running is an ascending/descending slope. Therefore, the vehicle speed cannot be determined with high accuracy, which implies that the correction torque also cannot be determined with high accuracy. Specifically, referring to FIG. 3, when the vehicle is running on an ascending/descending slope, a longitudinal acceleration Gx detected by a longitudinal acceleration sensor is affected not only by an acceleration (dV/dt) in the traveling direction of the vehicle but also by gravity.

$$Gx = (dV/dt) + g \cdot \sin(\theta) \qquad (1)$$

In this case, g indicates a gravitational acceleration, and $\theta$ indicates a slope angle of the road.

A vehicle speed VB obtained by temporally integrating the longitudinal acceleration signal based on the equation (1) is as follows:

$$VB = V_0 + \int (Gx) dt = V_0 + \int ((dV/dt) + g \cdot \sin(\theta)) dt \qquad (2)$$

In this case, $V_0$ indicates an initial speed at the time when the integration is started.

Consequently, if the vehicle speed VB is estimated based on the detection value Gx detected by the longitudinal acceleration sensor when the vehicle is on an ascending slope, the estimated speed will unfavorably be higher than the actual speed by the amount of the gravity component. Similarly, the vehicle speed VB will be lower than the actual speed when the vehicle is on a descending slope, thus eliminating the ability to perform a proper slip detection.

SUMMARY OF THE INVENTION

In view of the circumstances described above, it is an object of the present invention to provide a road-surface condition estimating device in a vehicle that allows for an estimation of a road-surface condition with high accuracy even when the road surface on which the vehicle is running is an ascending/descending slope.

The present invention provides a road-surface condition estimating device in a vehicle, the road-surface condition estimating device including driving-torque detecting means that detects a driving torque of an engine; longitudinal-acceleration detecting means that detects a longitudinal acceleration of the vehicle; driving-torque difference-value calculating means that calculates a difference between a currently detected driving torque of the engine and a previously detected driving torque of the engine as a driving-torque difference value; inertial-force difference-value calculating means that calculates a difference between a current inertial force of the vehicle and a previous inertial force of the vehicle as an inertial-force difference value on the basis of the longitudinal acceleration; inertial-force change-amount difference-value calculating means that calculates a difference between a current amount of change in inertial force of the vehicle and a previous amount of change in inertial force of the vehicle as an inertial-force change-amount difference value on the basis of the longitudinal acceleration; determination-coefficient calculating means that calculates at least one of a first determination coefficient and a second determination coefficient on the basis of a state equation related to the inertial-force change-amount difference value, the state equation being formed by adding a first arithmetic term to a second arithmetic term, the first arithmetic term being obtained by multiplying the inertial-force difference value by the first determination coefficient, the second arithmetic term being obtained by multiplying the driving-torque difference value by the second determination coefficient; and road-surface-condition determining means that determines a road-surface condition on the basis of the at least one of the first determination coefficient and the second determination coefficient.

The road-surface condition estimating device according to the present invention allows for an estimation of a road-surface condition with high accuracy even when the road surface on which the vehicle is running is an ascending/descending slope.

DESCRIPTION OF THE PREFERRED EMBODIMENTS

Embodiments of the present invention will now be described with reference to the drawings.

Figure 1:
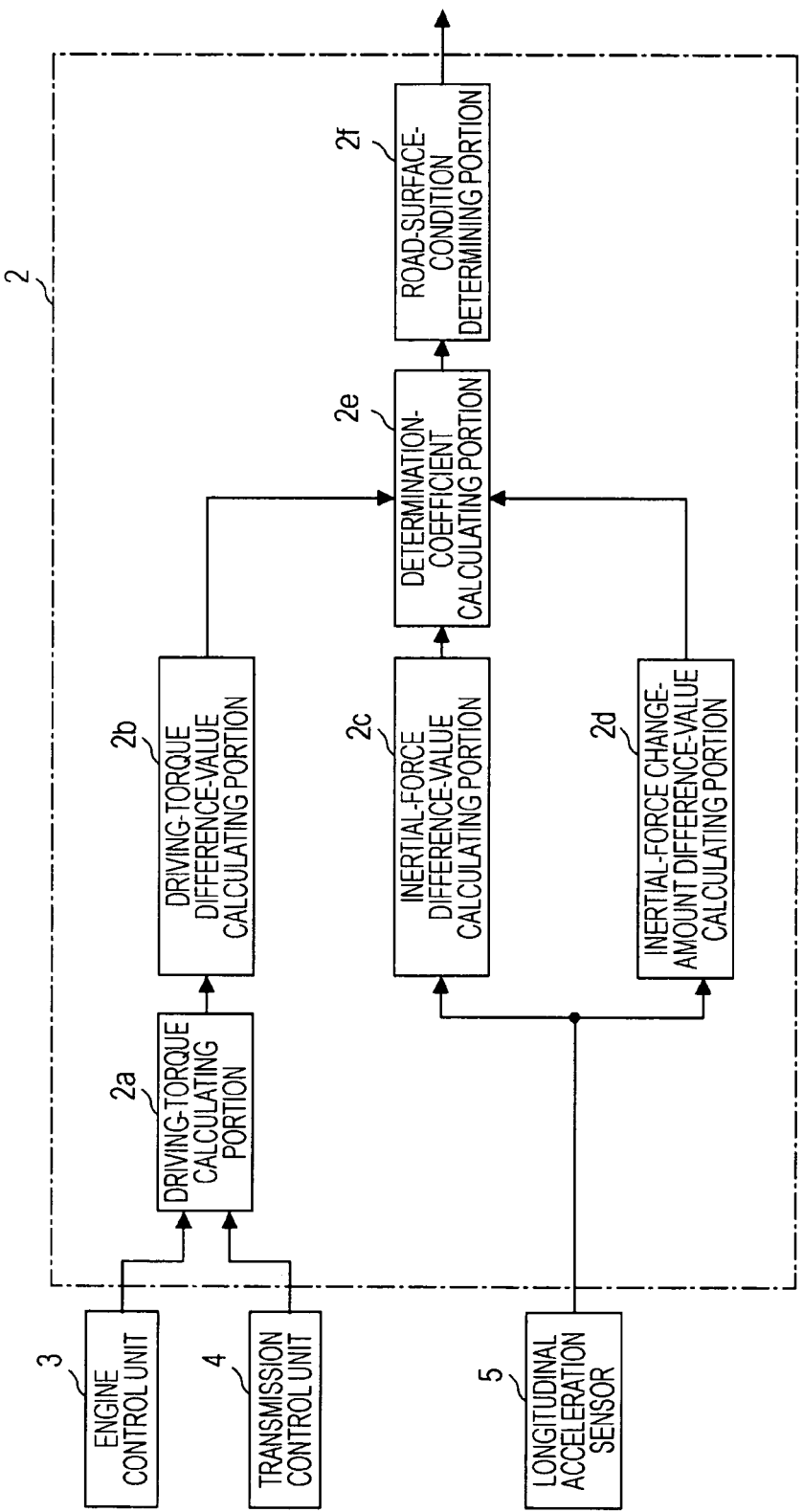
FIG. 1 is a functional block diagram of a road-surface condition estimating device according to a first embodiment of the present invention.
Figure 2:
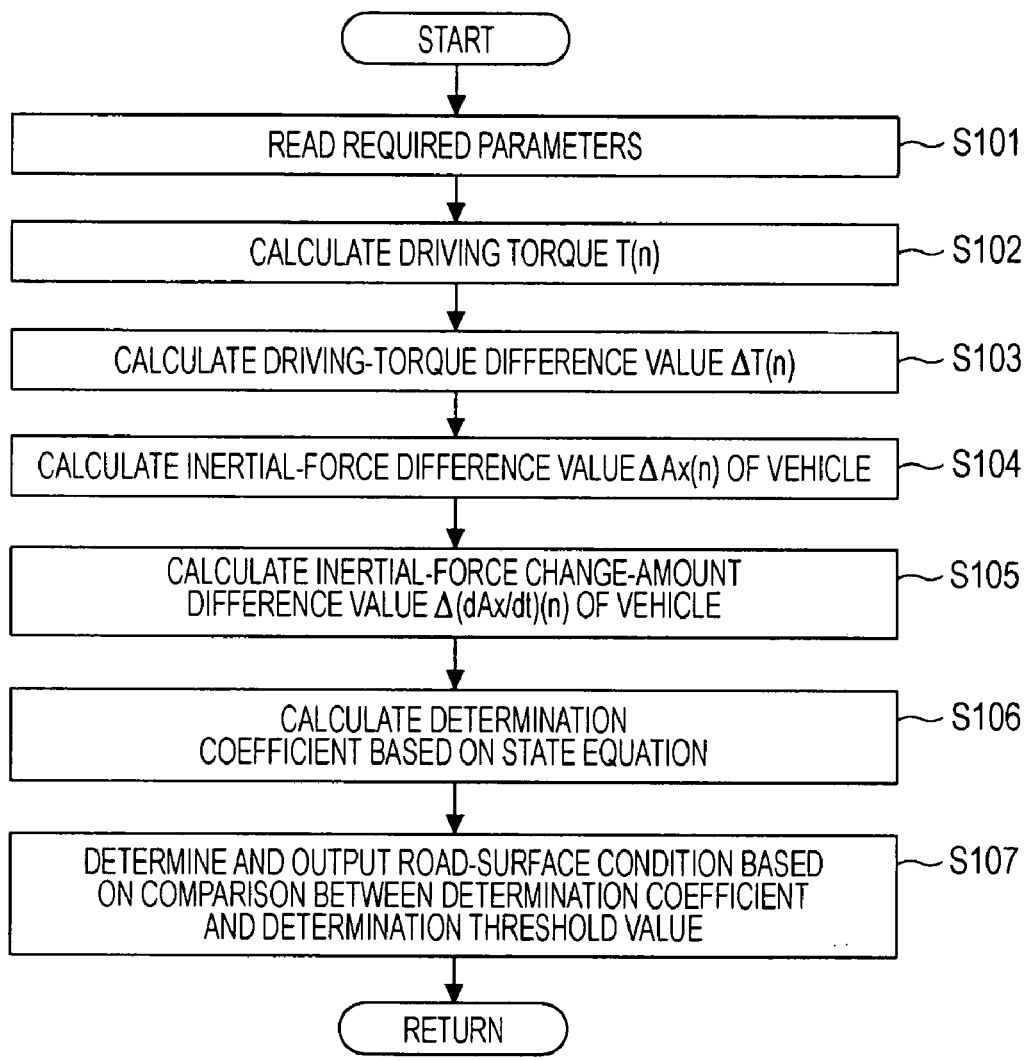
FIG. 2 is a flow chart of a road-surface condition estimating program according to the first embodiment.
Figure 3:
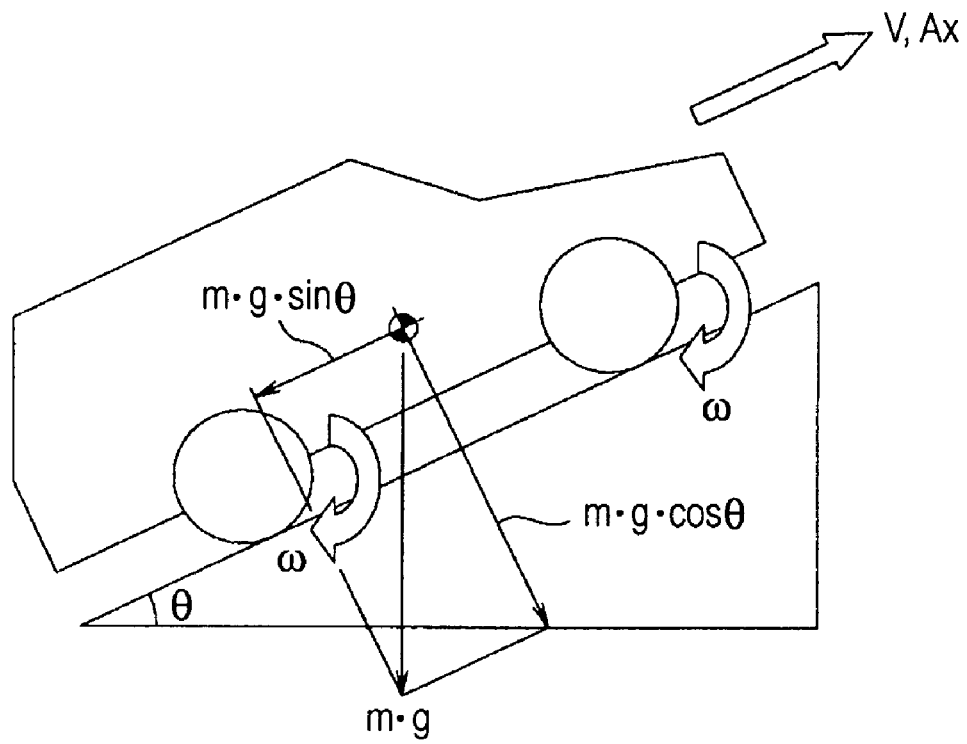
FIG. 3 is a diagram illustrating various parameters in a vehicle model according to the first embodiment.
Figure 4:
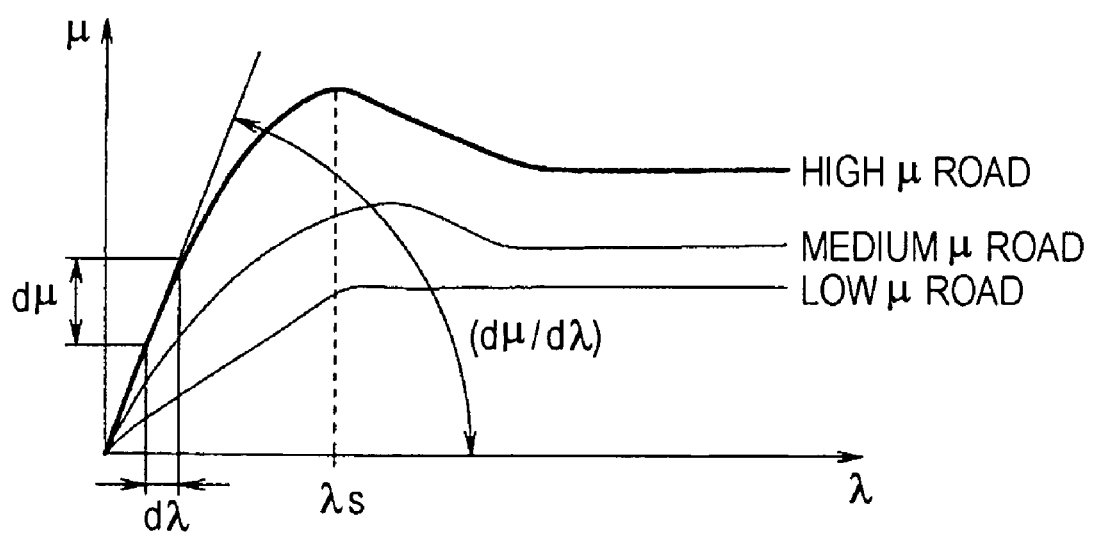
FIG. 4 is a diagram showing characteristic curves indicating road-surface friction coefficient versus slip rate relationships according to the first embodiment.

FIGS. 1 to 4 illustrate a first embodiment of the present invention. Specifically, FIG. 1 is a functional block diagram of a road-surface condition estimating device, FIG. 2 is a flow chart of a road-surface condition estimating program, FIG. 3 is a diagram illustrating various parameters in a vehicle model, and FIG. 4 is a diagram showing characteristic curves indicating road-surface friction coefficient versus slip rate relationships. The first embodiment is directed to a four-wheel drive vehicle as an example of a vehicle equipped with the road-surface condition estimating device. The various parameters to be used in the equations below are those shown in FIG. 3.

Referring to FIG. 1, reference numeral 1 denotes a road-surface condition estimating device which is equipped in a vehicle and estimates a road-surface condition. A control unit 2 of the road-surface condition estimating device 1 is connected to an engine control unit 3, to a transmission control unit 4, and to a longitudinal acceleration sensor 5 serving as longitudinal-acceleration detecting means, and receives therefrom signals indicating an engine speed $N_e$, a throttle opening $\theta_{th}$, a turbine speed $N_t$, a transmission gear ratio i, and a longitudinal acceleration Gx.

Based on these input signals, the control unit 2 of the road-surface condition estimating device 1 executes a road-surface estimating program to be described below so as to estimate and output a road-surface condition (a road-surface friction coefficient μ in this embodiment). Specifically, as shown in FIG. 1, the control unit 2 mainly includes a driving-torque calculating portion 2a, a driving-torque difference-value calculating portion 2b, an inertial-force difference-value calculating portion 2c, an inertial-force change-amount difference-value calculating portion 2d, a determination-coefficient calculating portion 2e, and a road-surface-condition determining portion 2f.

The driving-torque calculating portion 2a receives the engine speed $N_e$ and the throttle opening $\theta_{th}$ from the engine control unit 3 and also receives the turbine speed $N_t$ and the transmission gear ratio i from the transmission control unit 4. The driving-torque calculating portion 2a then calculates an engine output torque $T_e$ on the basis of a preset characteristic map indicating the relationship between the engine speed $N_e$ and the throttle opening $\theta_{th}$, and calculates a driving torque T from the following equation (3) on the basis of the engine output torque $T_e$. An additional character (n) given after each symbol indicates that the value is of a current state, whereas an additional character (n−1) given after a symbol indicates that the value is of a previous state (for example, a value corresponding to one previous sample).

$$T(n) = i \cdot i_f T_e(n) \cdot t_{conv} \tag{3}$$

In this case, $i_f$ indicates a gear ratio of a final reduction gear, $t_{conv}$ indicates a torque converter ratio of a torque converter (not shown). This torque converter ratio $t_{conv}$ is determined from a preset map based on a speed ratio e ($=N_t/N_e$) of the torque converter. The engine output torque $T_e$ may be a value directly received from the engine control unit 3, and the torque converter ratio $t_{conv}$ may be a value directly received from the transmission control unit 4.

The calculated driving torque T is output to the driving-torque difference-value calculating portion 2b. In other words, the driving-torque calculating portion 2a is provided as driving-torque detecting means.

The driving-torque difference-value calculating portion 2b receives the driving torque T from the driving-torque calculating portion 2a, calculates a driving-torque difference value ΔT from the following equation (4), and outputs the calculated driving-torque difference value ΔT to the determination-coefficient calculating portion 2e. In other words, the driving-torque difference-value calculating portion 2b is provided as driving-torque difference-value calculating means.

$$\Delta T(n) = T(n) - T(n-1) \tag{4}$$

The inertial-force difference-value calculating portion 2c receives the longitudinal acceleration Gx from the longitudinal acceleration sensor 5, calculates an inertial-force difference value ΔAx of the vehicle from the following equation (5), and outputs the calculated inertial-force difference value ΔAx to the determination-coefficient calculating portion 2e. In other words, the inertial-force difference-value calculating portion 2c is provided as inertial-force difference-value calculating means.

$$\Delta Ax(n) = \Delta Gx(n) = Gx(n) - Gx(n-1) \tag{5}$$

Since an angle of an ascending/descending slope changes much more moderately as compared to slipping of the tires, the term corresponding to the gravity in the longitudinal acceleration signal can be considered as a constant between neighboring sampling time periods. Consequently, although an actual longitudinal-acceleration difference value ΔGx(n) can be obtained from the following equation (6) using the aforementioned equation (1), an inertial-force difference value ΔAx of the vehicle is calculated from the aforementioned equation (5) and the effect of a sloped angle θ is removed, considering that there is substantially no change in the value of the sloped angle θ (i.e. θ(n)=θ(n−1)).

$$\begin{aligned}\Delta Gx(n) &= Gx(n) - Gx(n-1) \\ &= ((dV/dt)(n) + g \cdot \sin(\theta(n)) - \\ & \quad ((dV/dt)(n-1) + g \cdot \sin(\theta(n-1)))\end{aligned} \tag{6}$$

The inertial-force change-amount difference-value calculating portion 2d receives the longitudinal acceleration Gx from the longitudinal acceleration sensor 5, calculates a derivative value (dGx/dt) of the longitudinal acceleration Gx, calculates an inertial-force change-amount difference value Δ(dAx/dt) of the vehicle from the following equation (7), and outputs the calculated inertial-force change-amount difference value Δ(dAx/dt) to the determination-coefficient calculating portion 2e. In other words, the inertial-force change-amount difference-value calculating portion 2d is provided as inertial-force change-amount difference-value calculating means.

$$\Delta(dAx/dt)(n) = \Delta(dGx/dt)(n) \quad (7)$$
$$= (dGx/dt)(n) - (dGx/dt)(n-1)$$

Alternatively, the derivative value (dGx/dt) of the longitudinal acceleration Gx may be obtained from a signal from, for example, an additionally provided jerk sensor.

The determination-coefficient calculating portion 2e receives the driving-torque difference value ΔT from the driving-torque difference-value calculating portion 2b, the inertial-force difference value ΔAx of the vehicle from the inertial-force difference-value calculating portion 2c, and the inertial-force change-amount difference value Δ(dAx/dt) of the vehicle from the inertial-force change-amount difference-value calculating portion 2d. The determination-coefficient calculating portion 2e then estimates a first determination coefficient A by which ΔAx is to be multiplied or a second determination coefficient B by which ΔT is to be multiplied on the basis of the following state equation (8) having ΔAx as a state variable and ΔT as an input variable, and outputs the estimated coefficient to the road-surface-condition determining portion 2f. In other words, the determination-coefficient calculating portion 2e is provided as determination-coefficient calculating means.

$$\Delta(dAx/dt) = A \cdot \Delta Ax + B \cdot \Delta T \quad (8)$$

The state equation (8) mentioned above will now be described.

Referring to FIG. 3, when m indicates a vehicle mass, R indicates a tire radius, and I indicates total inertia of the wheels, and assuming that the wheels are controlled by a four-wheel drive mechanism so as to rotate at the same rotation speed indicated by ω, the driving torque T in the traveling direction of the vehicle can be expressed with the following equation (9):

$$T = R \cdot (m \cdot g \cdot \sin(\theta) + m \cdot Ax) + I \cdot (d\omega/dt) \quad (9)$$

The following equation (10) is a difference equation obtained on the basis of the equation (9).

$$\Delta T = m \cdot R \cdot \Delta Ax + \Delta(d\omega/dt) \cdot I \quad (10)$$

In the course of the derivation of the equation (10), the term m·g·sin(θ) representing a gravitational component is considered as being fixed as in the description of the aforementioned equation (5).

A total driving force Fd corresponding to tire characteristics is expressed with the following equation (11) based on a function μ of a slip rate λ (such as the one shown in FIG. 4) and a total ground load $F_z$.

$$\begin{aligned}
Fd &= m \cdot (g \cdot \sin(\theta) + Ax) \quad (11)\\
&= F_z \cdot \mu(\lambda)\\
&= m \cdot g \cdot \cos(\theta) \cdot \mu(\lambda)\\
&\approx m \cdot g \cdot \mu(\lambda)
\end{aligned}$$

The reason that cos(θ)≈1 in the equation (11) is that a sloped angle of an actual road is 30% at the highest, and a cos function in that state is approximately 0.96.

The following equation (12) is a difference equation obtained on the basis of the equation (11).

$$\Delta Ax = g \cdot (d\mu/d\lambda) \cdot \Delta \lambda \quad (12)$$

A slip rate λ is defined as λ=(ω−ωv)/ω(ωv indicating a wheel speed), and a difference equation obtained on the basis of this equation is the following equation (13).

$$\begin{aligned}
\Delta \lambda &= (1/\omega) \cdot ((\omega v/\omega) \cdot \Delta \omega - \Delta \omega v) \quad (13)\\
&\approx (1/\omega) \cdot (\Delta \omega - \Delta \omega v)
\end{aligned}$$

By substituting the equation (13) into the equation (12), the following equation (14) can be obtained:

$$\Delta Ax = g \cdot (d\mu/d\lambda) \cdot (1/\omega) \cdot (\Delta \omega - \Delta \omega v) \quad (14)$$

In this case, the wheel speed ωv in the equation (13) is a value converted to a wheel rotation speed by dividing the vehicle speed V by the tire radius R, but normally, a wheel speed ωv cannot be measured in a four-wheel drive vehicle. In the present invention, an inertial force of the vehicle, namely, a difference value of the vehicle acceleration Ax, can be determined from the longitudinal acceleration Gx in the aforementioned equation (5).

Specifically, $$R \cdot Ax = (d\omega v/dt) \quad (15)$$

Thus, $$\Delta(d\omega v/dt) = \Delta Ax/R \quad (16)$$

By substituting the equation (10) and the equation (16) into the equation (14), the following equation (11) can be obtained:

$$\Delta(dAx/dt) = g \cdot (d\mu/d\lambda) \quad (1/\omega) \cdot (-(m \cdot R^2 + I)/(I \cdot R) \cdot \Delta Ax + \Delta T/I) \quad (17)$$

By applying the following equations (18) and (19) with respect to the equation (17), the aforementioned state equation (8) can be obtained.

$$A = -g \cdot (d\mu/d\lambda) \cdot (1/\omega) \cdot (m \cdot R^2 + I)/(I \cdot R) \quad (18)$$

$$B = g \cdot (d\mu/d\lambda) \cdot (1/\omega) \cdot (1/I) \quad (19)$$

The values A and B in the aforementioned state equation (8) can be estimated in real time using a so-called parameter identification method. For example, in the case where a recursive least square method (RLS method) is used, the following equations (20) to (22) are applied:

$$\Delta(dAx/dt) = y(k) \quad (20)$$

$$p(k) = \begin{pmatrix} \Delta Ax(k) \\ \Delta T(k) \end{pmatrix} \quad (21)$$

$$\phi(k) = \begin{pmatrix} A(k) \\ B(k) \end{pmatrix} \quad (22)$$

In this case, the aforementioned state equation (8) can be expressed with the following equation (23):

$$y(k) = p(k-1)^T \cdot \phi(k-1) \quad (23)$$

Using the following recurrence equation (24) with respect to the equation (23), an estimation value φe of a coefficient φ is determined.

$$\phi e(k) = \phi e(k-1) - (F(k-1) \cdot p(k))/(f + p(k)^T \cdot F(k-1) \cdot p(k)) \cdot (p(k) \cdot \phi e(k-1) - y(k)) \quad (24)$$

In this case, f indicates a so-called decay function, and F(k) is determined from the following equation (25).

$$F(k)=(1/f)\cdot(F(k-1)-(F(k-1)\cdot p(k)\cdot p(k)^T\cdot F(k-1))/(f+p(k)^T\cdot F(k-1)\cdot p(k))) \quad (25)$$

The first determination coefficient A and the second determination coefficient B in the aforementioned equation (8) are both constants including $(d\mu/d\lambda)$ as shown in the equation (18) and the equation (19). As shown in FIG. 4, this $(d\mu/d\lambda)$ is a variable that indicates the grip condition of the tires, and is a gradient of a curve showing a tire slip rate versus equivalent road-surface friction coefficient $\mu$ (or braking-force/tire-ground-load) relationship.

For example, in the case where $(d\mu/d\lambda)$ is a $(d\mu/d\lambda)$ value corresponding to a high $\mu$ road and the tires are generating a driving force, it can be considered that a sufficient grip force is maintained. If the value of $(d\mu/d\lambda)$ is close to zero, the tires are under a gross slip condition. In that case, it can be determined that there is a need to actuate some kind of slip suppressing means. If $(d\mu/d\lambda)$ is determined to be close to a $(d\mu/d\lambda)$ value corresponding to a low $\mu$ road, it can be estimated that the vehicle is running on a slippery road surface. In that case, various slip preventing devices may be set to a high standby mode so that these slip preventing devices can be actuated immediately when a slippage occurs.

The road-surface-condition determining portion 2f determines the first determination coefficient A or second determination coefficient B including such a $(d\mu/d\lambda)$ value so as to determine the road-surface condition. In other words, the road-surface-condition determining portion 2f is provided as road-surface-condition determining means.

In the case where the first determination coefficient A is used, the determination is implemented as follows:
When $|A| \geq K_{AH}$, the road surface is a high $\mu$ road.
When $K_{AH} > |A| \geq K_{AL}$, the road surface is a medium $\mu$ road.
When $|A| < K_{AL}$, the road surface is a low $\mu$ road.

In this case, $K_{AH}$ and $K_{AL}$ are constants (determination threshold values) preliminarily determined based on experiment, calculation, etc., and $K_{AH} > K_{AL}$.

In the case where the second determination coefficient B is used, the determination is implemented as follows:
When $|B| \leq K_{BH}$, the road surface is a high $\mu$ road.
When $K_{BH} > |B| \geq K_{BL}$, the road surface is a medium $\mu$ road.
When $|B| < K_{BL}$, the road surface is a low $\mu$ road.

In this case, $K_{BH}$ and $K_{BL}$ are constants (determination threshold values) preliminarily determined based on experiment, calculation, etc., and $K_{BH} > K_{BL}$.

In the first embodiment, the determination of a road-surface friction coefficient $\mu$ is implemented based on three stages by comparing the preset threshold values $K_{AH}$ and $K_{AL}$ with the first determination coefficient A or by comparing the preset threshold values $K_{BH}$ and $K_{BL}$ with the second determination coefficient B. Alternatively, the determination of a road-surface friction coefficient $\mu$ may be implemented based on two stages by setting only one threshold value. As a further alternative, the determination of a road-surface friction coefficient $\mu$ may be implemented more finely based on a larger number of stages by setting more threshold values and comparing the corresponding determination coefficient with these threshold values.

Instead of being constants, the threshold values $K_{AH}$, $K_{AL}$, $K_{BH}$, and $K_{BL}$ may be values that are adjustable in accordance with the vehicle speed V (i.e. wheel speed $\omega$: e.g. an average value of the four-wheel speeds). In that case, supposing that the value of $(d\mu/d\lambda)$ when the value of road-surface friction coefficient $\mu$ to be determined based on the threshold value $K_{AH}$ or $K_{BH}$ is defined as $(d\mu/d\lambda)H$ and the value of $(d\mu/d\lambda)$ when the value of road-surface friction coefficient $\mu$ to be determined based on the threshold value $K_{AL}$ or $K_{BL}$ is defined as $(d\mu/d\lambda)L$, the threshold values $K_{AH}$, $K_{AL}$, $K_{BH}$, and $K_{BL}$ can be set by calculating the following equations (26) to (29) based on the aforementioned equation (18) and equation (19).

$$K_{AH}=-g\cdot(d\mu/d\lambda)H\cdot(1/\omega)\cdot(m\cdot R^2+I)/(I\cdot R) \quad (26)$$

$$K_{AL}=-g\cdot(d\mu/d\lambda)L\cdot(1/\omega)\cdot(m\cdot R^2+I)/(I\cdot R) \quad (27)$$

$$K_{BH}=g\cdot(d\mu/d\lambda)H\cdot(1/\omega)(1/I) \quad (28)$$

$$K_{BL}=g\cdot(d\mu/d\lambda)L\cdot(1/\omega)\cdot(1/I) \quad (29)$$

By setting the determination threshold values in accordance with the adjustment based on the wheel speed $\omega$ in order to determine the road-surface condition in the above-described manner, the estimation of a road-surface condition can be implemented with even higher accuracy.

The road-surface condition (road-surface friction coefficient $\mu$) determined at the road-surface-condition determining portion 2f in this manner is output to, for example, an external display device (not shown) and is displayed at an instrument panel so that the driver can be informed of the condition. Alternatively, the road-surface condition may be output to an engine control unit, a transmission control unit, a driving-force distribution control unit, a brake control unit, etc. (none of which are shown) so as to be used as a basis for setting the control amounts in these control units.

The road-surface estimating program executed by the control unit 2 of the road-surface condition estimating device 1 will now be described with reference to the flow chart in FIG. 2.

First, in step S101, required parameters are read, which include an engine speed $N_e$, a throttle opening $\theta_{th}$, a turbine speed $N_t$, a transmission gear ratio i, and a longitudinal acceleration Gx.

In step S102, the driving-torque calculating portion 2a calculates a driving torque T(n) from the aforementioned equation (3).

In step S103, the driving-torque difference-value calculating portion 2b calculates a driving-torque difference value $\Delta T(n)$ from the aforementioned equation (4).

In step S104, the inertial-force difference-value calculating portion 2c calculates an inertial-force difference value $\Delta Ax(n)$ of the vehicle from the aforementioned equation (5).

In step S105, the inertial-force change-amount difference-value calculating portion 2d calculates an inertial-force change-amount difference value $\Delta(dAx/dt)(n)$ of the vehicle from the aforementioned equation (7).

In step S106, the determination-coefficient calculating portion 2e solves the aforementioned state equation (8) so as to estimate a first determination coefficient A or a second determination coefficient B.

In step S107, the road-surface-condition determining portion 2f compares the first determination coefficient A or second determination coefficient B with the corresponding threshold values ($K_{AH}$ and $K_{AL}$ or $K_{BH}$ and $K_{BL}$) so as to determine a road-surface condition. The determination result is subsequently output, whereby the program ends.

According to the first embodiment of the present invention, a driving-torque difference value $\Delta T$, an inertial-force difference value $\Delta Ax$ of the vehicle, and an inertial-force change-amount difference value $\Delta(dAx/dt)$ of the vehicle are calculated, a first determination coefficient A by which $\Delta Ax$ is to be multiplied or a second determination coefficient B by which $\Delta T$ is to be multiplied is estimated on the basis of a state equation having $\Delta Ax$ as a state variable and $\Delta T$ as an input variable, and a road-surface condition is determined on the basis of the first determination coefficient A or the second determination coefficient B. This allows for an estimation of a road-surface condition not only at the grip limit of the tires but also over a wide running range. Even when the vehicle is running on a sloped road surface, the road-surface condition can be estimated with high accuracy without including errors caused by the slope.

A second embodiment of the present invention will now be described.

Figure 5:
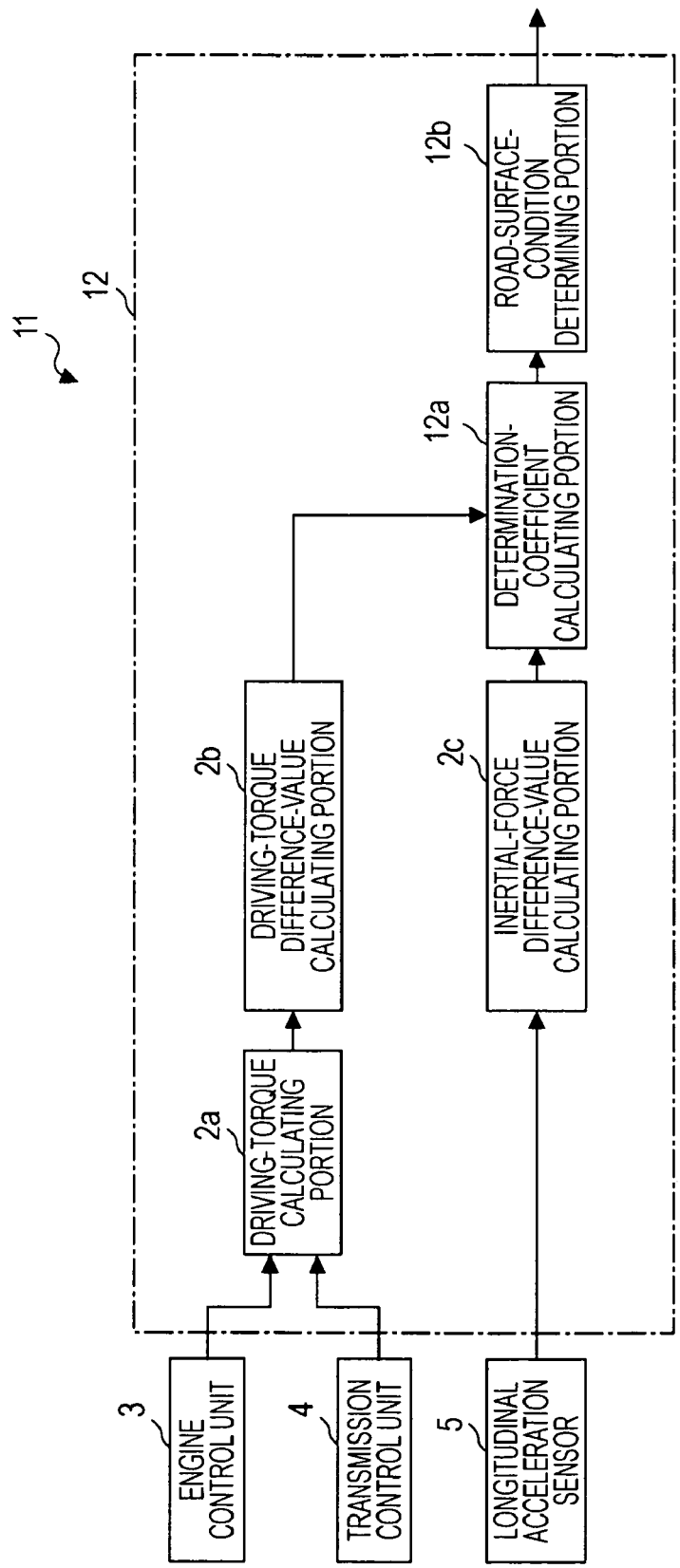
FIG. 5 is a functional block diagram of a road-surface condition estimating device according to a second embodiment of the present invention.
Figure 6:
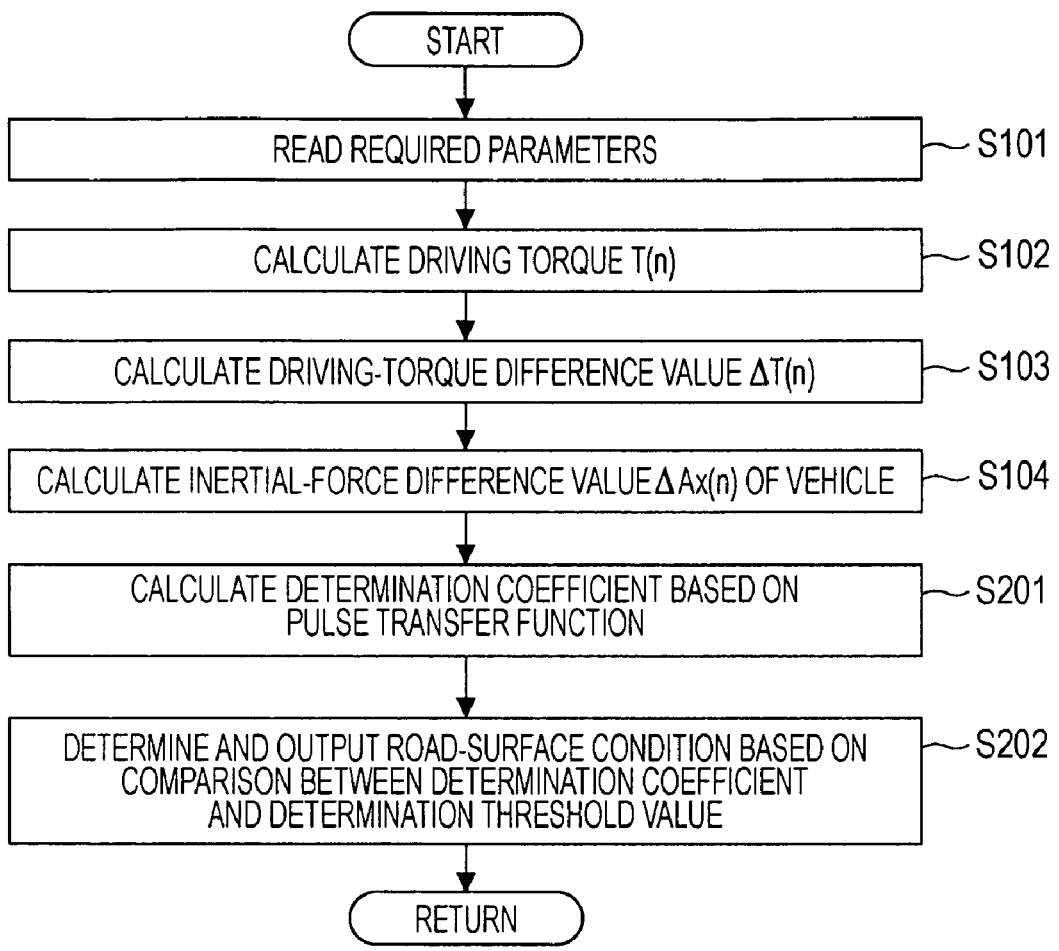
FIG. 6 is a flow chart of a road-surface condition estimating program according to the second embodiment.

FIGS. 5 and 6 illustrate the second embodiment of the present invention. Specifically, FIG. 5 is a functional block diagram of a road-surface condition estimating device, and FIG. 6 is a flow chart of a road-surface condition estimating program. The second embodiment differs from the first embodiment in that the determination coefficients used for determining a road-surface condition are determined by solving a pulse transfer function. Other configurations and features in the second embodiment are the same as those in the first embodiment, and therefore, components in the second embodiment that are the same as those in the first embodiment are given the same reference numerals, and descriptions of those components will not be repeated.

Referring to FIG. 5, reference numeral 11 denotes a road-surface condition estimating device which is equipped in a vehicle and estimates a road-surface condition. A control unit 12 of the road-surface condition estimating device 11 is connected to the engine control unit 3, to the transmission control unit 4, and to the longitudinal acceleration sensor 5 serving as longitudinal-acceleration detecting means, and receives therefrom signals indicating an engine speed $N_e$, a throttle opening $\theta_{th}$, a turbine speed $N_t$, a transmission gear ratio i, and a longitudinal acceleration Gx.

Based on these input signals, the control unit 12 of the road-surface condition estimating device 11 executes a road-surface estimating program to be described below so as to estimate and output a road-surface condition (a road-surface friction coefficient μ in this embodiment). Specifically, as shown in FIG. 5, the control unit 12 mainly includes the driving-torque calculating portion 2a, the driving-torque difference-value calculating portion 2b, the inertial-force difference-value calculating portion 2c, a determination-coefficient calculating portion 12a, and a road-surface-condition determining portion 12b.

The determination-coefficient calculating portion 12a receives a driving-torque difference value ΔT from the driving-torque difference-value calculating portion 2b and an inertial-force difference value ΔAx of the vehicle from the inertial-force difference-value calculating portion 2c. The determination-coefficient calculating portion 12a then estimates a third determination coefficient P by which ΔAx is to be multiplied or a fourth determination coefficient Q by which ΔT is to be multiplied on the basis of a pulse transfer function (30) shown below, and outputs the estimated coefficient to the road-surface-condition determining portion 12b. In other words, the determination-coefficient calculating portion 12a is provided as determination-coefficient calculating means.

$$\Delta Ax(n+1) = P \cdot \Delta Ax(n) + Q \cdot \Delta T(n) \tag{30}$$

As a characteristic of a pulse transfer function, it is known that the first determination coefficient A and the second determination coefficient B in the aforementioned state equation (8) and the determination coefficients P and Q in the pulse transfer function (30) have the relationships as shown in the following equation (31) and equation (32).

$$P = \exp(A \cdot \tau) \tag{31}$$

$$Q = B \cdot (\exp(A \cdot \tau) - 1)/A \tag{32}$$
$$= R/(m \cdot R^2 + I) \cdot (1 - \exp(A \cdot \tau))$$

In this case, τ indicates a sampling time.

Accordingly, each of the determination coefficients P and Q includes (dμ/dλ) that indicates the grip condition of the tires. As the tires approach a slip condition, the determination coefficient P approaches 1 and the determination coefficient Q approaches 0, whereby a road-surface condition can be detected.

Since parameter identification methods such as an RLS method and a fixed trace method are widely known as methods for estimating the determination coefficients P and Q, the determination coefficients P and Q can be estimated using these methods. For example, in the case where the RLS method is used, the following equations (33) and (34) are applied:

$$\Delta Ax(n+1) = y(k) \tag{33}$$

$$\phi(k) = \begin{pmatrix} P(k) \\ Q(k) \end{pmatrix} \tag{34}$$

Thus, the coefficient φ in the aforementioned equation (23) can be estimated from the equation (24).

The road-surface-condition determining portion 12b determines the third determination coefficient P or the fourth determination coefficient Q received from the determination-coefficient calculating portion 12a in order to determine the road-surface condition. In other words, the road-surface-condition determining portion 12b is provided as road-surface-condition determining means.

In the case where the third determination coefficient P is used, the determination is implemented as follows:

When $P \geq K_{PH}$, the road surface is a low μ road.
When $K_{PH} > P \geq K_{PL}$, the road surface is a medium μ road.
When $P < K_{PL}$, the road surface is a high μ road.

In this case, $K_{PH}$ and $K_{PL}$ are constants (determination threshold values) preliminarily determined based on experiment, calculation, etc., and $K_{PH} > K_{PL}$.

In the case where the fourth determination coefficient Q is used, the determination is implemented as follows:

When $Q \geq K_{QH}$, the road surface is a high μ road.
When $K_{QH} > Q \geq K_{QL}$, the road surface is a medium p road.
When $Q < K_{QL}$, the road surface is a low p road.

In this case, $K_{QH}$ and $K_{QL}$ are constants (determination threshold values) preliminarily determined based on experiment, calculation, etc., and $K_{QH} > K_{QL}$.

In the second embodiment, the determination of a road-surface friction coefficient μ is implemented based on three stages by comparing the preset threshold values $K_{PH}$ and $K_{PL}$ with the third determination coefficient P or by comparing the preset threshold values $K_{QH}$ and $K_{QL}$ with the fourth determination coefficient Q. Alternatively, the determination of a road-surface friction coefficient μ may be implemented based on two stages by setting only one threshold value. As a further alternative, the determination of a road-surface friction coefficient μ may be implemented more finely based on a larger number of stages by setting more threshold values and comparing the corresponding determination coefficient with these threshold values.

Instead of being constants, the threshold values $K_{PH}$, $K_{PL}$, $K_{QH}$, and $K_{QL}$ may be values that are adjustable in accordance with the vehicle speed V (i.e. wheel speed ω): e.g. an average value of the four-wheel speeds). In that case, supposing that the value of (dμ/dλ) when the value of road-surface friction coefficient μ to be determined based on the threshold value $K_{PH}$ or $K_{QL}$ is defined as (dμ/dλ)L and the value of (dμ/dλ) when the value of road-surface friction coefficient μ to be determined based on the threshold value $K_{PL}$ or $K_{QH}$ is defined as (dμ/dλ)H, the threshold values $K_{PH}$, $K_{PL}$, $K_{QH}$, and $K_{QL}$ can be set by calculating the following equations (35) to (38) based on the aforementioned equation (18), equation (19), equation (31), and equation (32).

$$K_{PH}=\exp(-g\cdot(d\mu/d\lambda)L\cdot(1/\omega)\cdot(m\cdot R^2+I)\cdot\tau/(I\cdot R)) \quad (35)$$

$$K_{PL}=\exp(-g\cdot(d\mu/d\lambda)H\cdot(1/\omega)\cdot(m\cdot R^2+I)\cdot\tau/(I\cdot R)) \quad (36)$$

$$K_{QH}=R/(m\cdot R^2+I)\cdot(1-\exp(-g\cdot(d\mu/d\lambda)H\cdot(1/\omega)\cdot(m\cdot R^2+I)\cdot\tau/(I\cdot R))) \quad (37)$$

$$K_{QL}=R/(m\cdot R^2+I)\cdot(1-\exp(-g\cdot(d\mu/d\lambda)L\cdot(1/\omega)\cdot(m\cdot R^2+I)\cdot\tau/(I\cdot R))) \quad (38)$$

By setting the determination threshold values in accordance with the adjustment based on the wheel speed ω in order to determine the road-surface condition in the above-described manner, the estimation of a road-surface condition can be implemented with even higher accuracy.

The road-surface condition (road-surface friction coefficient μ) determined at the road-surface-condition determining portion 12b in this manner is output to, for example, an external display device (not shown) and is displayed at an instrument panel so that the driver can be informed of the condition. Alternatively, the road-surface condition may be output to an engine control unit, a transmission control unit, a driving-force distribution control unit, a brake control unit, etc. (none of which are shown) so as to be used as a basis for setting the control amounts in these control units.

The road-surface estimating program executed by the control unit 12 of the road-surface condition estimating device 11 will now be described with reference to the flow chart in FIG. 6.

First, in step S101, required parameters are read, which include an engine speed $N_e$, a throttle opening $\theta_{th}$, a turbine speed $N_t$, a transmission gear ratio i, and a longitudinal acceleration Gx.

In step S102, the driving-torque calculating portion 2a calculates a driving torque T(n) from the aforementioned equation (3).

In step S103, the driving-torque difference-value calculating portion 2b calculates a driving-torque difference value ΔT(n) from the aforementioned equation (4).

In step S104, the inertial-force difference-value calculating portion 2c calculates an inertial-force difference value ΔAx(n) of the vehicle from the aforementioned equation (5).

In step S201, the determination-coefficient calculating portion 12a solves the pulse transfer function (30) so as to estimate a third determination coefficient P or a fourth determination coefficient Q.

In step S202, the road-surface-condition determining portion 12b compares the third determination coefficient P or fourth determination coefficient Q with the corresponding threshold values ($K_{PH}$ and $K_{PL}$ or $K_{QH}$ and $K_{QL}$) so as to determine a road-surface condition. The determination result is subsequently output, whereby the program ends.

According to the second embodiment of the present invention, a driving-torque difference value ΔT and an inertial-force difference value ΔAx are calculated, a third determination coefficient P by which ΔAx is to be multiplied or a fourth determination coefficient Q by which ΔT is to be multiplied is estimated on the basis of a pulse transfer function, and a road-surface condition is determined on the basis of the third determination coefficient P or the fourth determination coefficient Q. Similar to the first embodiment, this allows for an estimation of a road-surface condition not only at the grip limit of the tires but also over a wide running range. Even when the vehicle is running on a sloped road surface, the road-surface condition can be estimated with high accuracy without including errors caused by the slope.

Since the road-surface condition is estimated on the basis of a pulse transfer function in the second embodiment, it is not necessary to determine a time derivative of the longitudinal acceleration. Normally, it is difficult to directly measure a time derivative of the longitudinal acceleration. Although a time derivative of the longitudinal acceleration can be calculated by differentiating data with respect to time-series detection values of a longitudinal acceleration sensor, since the longitudinal acceleration changes drastically, it is necessary to filter the signal from the longitudinal acceleration sensor in order to obtain a reliable derivative result. This filtering process unavoidably produces an adverse effect on the responsiveness. Japanese Unexamined Patent Application Publication No. 2006-023287 discloses a principle of a sensor for directly measuring a jerk, which is a time derivative of a longitudinal acceleration, and it may be possible to obtain highly reliable data using such a sensor. However, an addition of such a designated sensor can be problematic in terms of, for example, an increase in cost. In contrast, the second embodiment of the present invention can allow for an estimation of a road-surface condition with high accuracy without the need for such an additional sensor.

Although the first and second embodiments described above are particularly directed to a four-wheel drive vehicle in which an estimation of a road-surface condition can be difficult, the first and second embodiments can also be applied to a two-wheel drive vehicle of a front-wheel drive type or a rear-wheel drive type. In that case, the longitudinal acceleration Gx is estimated with high accuracy based on the rotation speed information about the driven wheels that do not transmit a driving force to the road surface, whereby Ax and (dAx/dt) can be obtained without requiring a longitudinal acceleration sensor. In addition, if the vehicle load shared by the driving wheels is represented by md, the aforementioned equation (17), for example, can be expressed as the following equation (39):

$$\Delta(dAx/dt)=(md/m)\cdot g\cdot(d\mu/d\lambda)\cdot(1/\omega)\cdot(-(m\cdot R^2+I)/(I\cdot R)\cdot\Delta Ax+\Delta T/I) \quad (39)$$

Specifically, by changing the form of other equations in view of the proportion of the vehicle load shared by the driving wheels, the road-surface condition can be estimated under the same principle as described above on the basis of determination coefficients obtained from a state equation (first embodiment) or determination coefficients obtained from a pulse transfer function (second embodiment).

What is claimed is:
1. A road-surface condition estimating device, comprising:
driving-torque detecting means that detects a driving torque of an engine;
longitudinal-acceleration detecting means that detects a longitudinal acceleration of the vehicle;

driving-torque difference-value calculating means that calculates a difference between a currently detected driving torque of the engine and a previously detected driving torque of the engine as a driving-torque difference value;

inertial-force difference-value calculating means that calculates a difference between a current inertial force of the vehicle and a previous inertial force of the vehicle as an inertial-force difference value on the basis of the longitudinal acceleration;

inertial-force change-amount difference-value calculating means that calculates a difference between a current amount of change in inertial force of the vehicle and a previous amount of change in inertial force of the vehicle as an inertial-force change-amount difference value on the basis of the longitudinal acceleration;

determination-coefficient calculating means that calculates at least one of a first determination coefficient and a second determination coefficient on the basis of a state equation related to the inertial-force change-amount difference value, the state equation being formed by adding a first arithmetic term to a second arithmetic term, the first arithmetic term being obtained by multiplying the inertial-force difference value by the first determination coefficient, the second arithmetic term being obtained by multiplying the driving-torque difference value by the second determination coefficient; and road-surface-condition determining means that determines a road-surface condition on the basis of the at least one of the first determination coefficient and the second determination coefficient.

2. The road-surface condition estimating device according to claims 1, wherein the road-surface-condition determining means determines the road-surface condition on the basis of the at least one of the determination coefficients by comparing the at least one of the determination coefficients with a determination threshold value that is preliminarily adjustably set in accordance with a vehicle speed.

3. A road-surface condition estimating device, comprising:
driving-torque detecting means that detects a driving torque of an engine;

longitudinal-acceleration detecting means that detects a longitudinal acceleration of the vehicle;

driving-torque difference-value calculating means that calculates a difference between a currently detected driving torque of the engine and a previously detected driving torque of the engine as a driving-torque difference value;

inertial-force difference-value calculating means that calculates a difference between a current inertial force of the vehicle and a previous inertial force of the vehicle as an inertial-force difference value on the basis of the longitudinal acceleration;

determination-coefficient calculating means that calculates at least one of a third determination coefficient and a fourth determination coefficient on the basis of a pulse transfer function related to the inertial-force difference value, the pulse transfer function being formed by adding a first arithmetic term to a second arithmetic term, the first arithmetic term being obtained by multiplying the inertial-force difference value by the third determination coefficient, the second arithmetic term being obtained by multiplying the driving-torque difference value by the fourth determination coefficient; and road-surface-condition determining means that determines a road-surface condition on the basis of the at least one of the third determination coefficient and the fourth determination coefficient.

4. The road-surface condition estimating device according to claims 3, wherein the road-surface-condition determining means determines the road-surface condition on the basis of the at least one of the determination coefficients by comparing the at least one of the determination coefficients with a determination threshold value that is preliminarily adjustably set in accordance with a vehicle speed.

* * * * *